United States Patent [19]
White

[11] 3,891,962
[45] June 24, 1975

[54] ELECTRONIC INSECT CONTROLLER

[75] Inventor: Herbert Montgomery White, Carleton Place, Canada

[73] Assignee: Tritronics (1971) Ltd., Weston, Canada

[22] Filed: Oct. 10, 1972
(Under Rule 47)

[21] Appl. No.: 296,049

[30] Foreign Application Priority Data
Oct. 7, 1971   Canada............................ 124720

[52] U.S. Cl.................. 340/15; 181/.5 R; 340/3 A; 43/107; 43/124; 43/132
[51] Int. Cl. ............................................. H04b 11/00
[58] Field of Search............... 181/.5 R, .5 J, .5 NF; 340/3 A, 15; 43/132, 124, 131, 107; 343/18 VJ

[56] References Cited
UNITED STATES PATENTS
3,058,103  10/1962  Evans ............................. 181/.5 NF
3,557,899  1/1971  Longinette..................... 181/.5 NF Primary Examiner—Maynard R. Wilbur
Assistant Examiner—N. Moskowitz
Attorney, Agent, or Firm—Burns, Doane, Swecker & Mathis

[57] ABSTRACT

An apparatus for repelling insects comprising a direct current power source, an oscillator comprising a pair of unijunction transistors and a transducer connected to said oscillator adapted to convert electrical output signals from said oscillator into sonic signals; said device being adapted to produce multiple frequency sonic output signals the frequencies of which are continuously varied, said sonic signals comprising fundamental and harmonic components.

9 Claims, 5 Drawing Figures 3,891,962

ELECTRONIC INSECT CONTROLLER

BACKGROUND OF THE INVENTION

It is well established through Entomological research in many countries that insects are responsive to particular sound frequencies and may be repelled or attracted by these sounds in a variety of situations. However, the research programs carried out to date have proceeded with specific frequencies produced and measured in relation to a single species of insect and also in the majority of cases using high power intensities, whether for attraction or repulsion purposes. These programs have utilized as a basic premise that insects are repelled by sounds produced by natural predators and conversely the insects may be attracted by sounds produced during the mating cycle inherent to each species. As previously indicated, experimental programs with detailed results have shown which insects and to what degree each species are affected by sounds in nature. It has also been possible to produce laboratory stimulations of the natural sounds while duplicating the various environmental conditions which would be expected in the insects' normal life cycle such as temperature, humidity and the like.

The methods utilized to produce the artificial sounds have also involved high intensities at different frequencies and power levels which may be objectionable to animals and humans, if not dangerous.

SUMMARY OF THE INVENTION

This invention relates to an electronic device for generating sonic signals for repelling insects.

It is an object of this invention to provide a portable, self-powered sonic generator having an electronic oscillator circuit such that sounds emitted by the unit afford protection from biting or stinging insects by discouraging the insects from the immediate vicinity.

Practical experiments have shown that the minimum area that need be so protected for any one person is a cone of about 10 feet in diameter at ground level which extends to a point not less than 3 feet above the head of the person to be protected, when the sound producing unit is aimed vertically down from above a person to provide an umbrella-shaped area of protection.

It will be appreciated that standard techniques for controlling direction, intensity and dispersion of sound may be utilized with this device to obtain the maximum protection with the power output available from a standard unit, and that by use of amplification, the protected area may be greatly increased and other directivity patterns provided.

The present invention provides a device for repelling insects, comprising means for providing a source of electrical power; means for generating continuously varying multiple frequency electrical signals; and means for converting said electrical signals to sonic signals. Ceramic or crystal transducers provide efficient sound reproduction at the power levels and frequencies covered, and in addition, are able to reproduce multiple harmonics up to 100 kilohertz, which adds to the overall effectiveness of the device.

DESCRIPTION OF THE PREFERRED EMBODIMENTS

Figure 1:
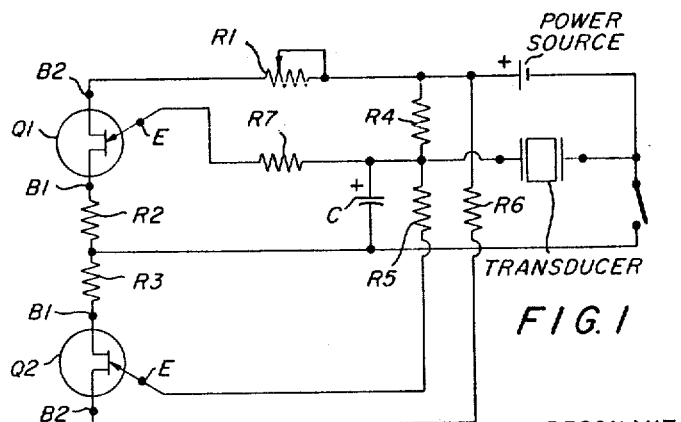
FIG. 1 is a circuit diagram showing an oscillator circuit in accordance with the present invention.
Figure 2:
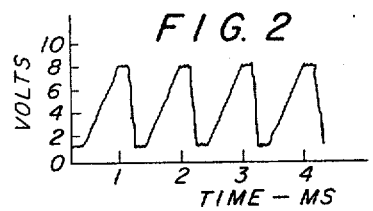
FIG. 2 is a wave force diagram showing the output electrical signal at the transducer terminals of the circuit shown in FIG. 1.
Figure 4:
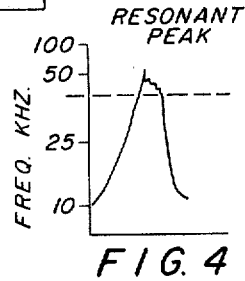
FIG. 4 is a graph illustrating the frequency variation of the sonic signal, with time.
Figure 3:
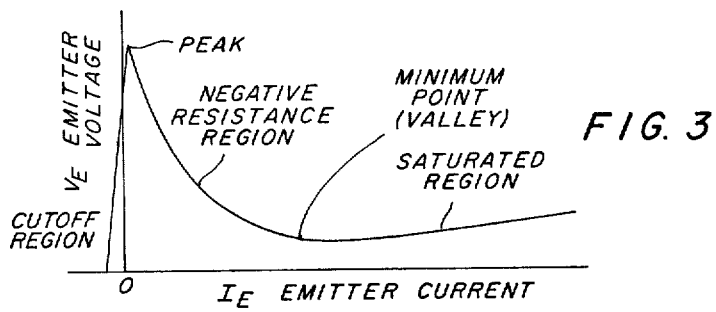
FIG. 3 is a graph showing the characteristics of a unijunction transistor employed in the circuit of FIG. 1.
Figure 5:
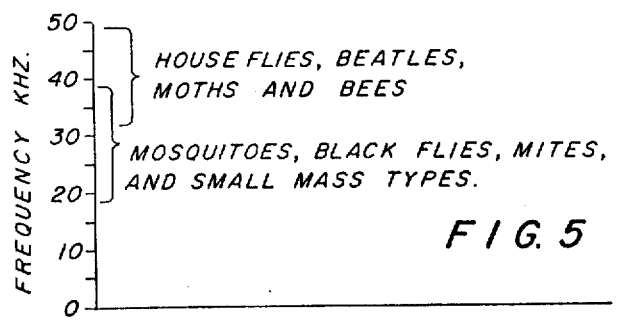
FIG. 5 is a chart showing the relationship between insect species and frequencies most effective in detecting these species from a given area.

As shown in FIG. 1, unijunction transistors Q1 and Q2 are connected with their Base 1 terminals in parallel with the negative side of the load, said load being of very high impedance at the operating frequencies of the circuit. The emitter terminals E of the transistors are connected in parallel with the positive side of said load T. The Base 2 terminals of transistors Q1 and Q2 are connected to the positive side of the current source E, and resistors R1 to R7 together with capacitor C are situated within the network which provides an R-C constant that ensures that Q1 is the control transistor for the circuit. With this arrangement Q1 fires first when power is applied and Q2 acts as a mirror chopper when peak fundamentals of Q1 R.C. frequencies are reached. Typical values and component information is as follows:

| | |
|---|---|
| Q1, Q2 | GE2N2646 |
| R1 | 10k linear pot with On-Off sw. |
| R2 | 50Ω |
| R3 | 50Ω |
| R4 | 47kΩ |
| R5 | 300kΩ |
| R6 | 300kΩ |
| R7 | 500Ω |
| C | 1mf/35v polarized tantalum |
| T | Crystal or Ceramic Transducer to cover approximately 10 to 100 k hz |

The circuit, as illustrated in FIG. 1 with discrete components, is a free-running oscillator producing a saw tooth waveform with fundamental frequencies between 10 and 50 kilohertz, also incorporating a sweep rate which is variable between 6 and 40 cycles per second. The power output may be in the order of 12 milliwatts RMS at the output terminals of the transducer with a measurable harmonic power at the same terminals of approximately 3 milliwatts at frequencies up to 100 kilohertz. There are also resonant peaks in the fundamental sweep range which together with the overall averaging effect of the sweep can be varied up or down about 15 percent to provide maximum deterrence against different insects. For example, it has been determined that female mosquitoes, which are the only mosquitoes that bite, have an antipathy to frequencies of 11–12 k hz and 36–38 k hz. Therefore where it is desired to control mosquitoes the characteristics of the circuitry can be arranged so that these frequencies are made predominant.

The example of mosquitoe activity is only one of numerous approaches to control of insects, as different insects have sound receptor systems that operate in different fashions.

Basically it can be stated that most insects are affected by frequencies below 100 kilohertz and in fact are specifically attracted or repelled by one or more given frequencies.

Some insects can be discouraged from an area while they are in flight because their tympanal organs detect the emitted sounds from the repelling device and translate this information into protective reactions in a similar fashion to that which would occur when detection of echolocating sounds of their predators took place.

Other insects can be repelled from an area when in a resting state since the overall reaction is caused by sound pressure gradients and if the sound level is sufficiently high that the physical mass of the insect corelates to displacement of air molecules caused by the emitted sound, the insect will move away from the sound source whether or not its sensory apparatus indicates the necessity of flight activity or crawling further from the offending sounds.

In general it may be stated that all insects respond to sounds at some frequency and at certain intensities so that by application of artificial sound to the phonotactic and phonokinetic behavioural responses of each species, it is possible to exclude the insects from predictable dimensional areas.

In contrast to procedures which have utilized single frequency tones or sine waves, the present invention provides a multitude of frequencies which are continuously changing from the lowest to the highest frequencies with a rapid turn off at the highest selected point and fast drop to the low frequency starting point.

What I claim as my invention is:

1. A device for repelling insects comprising electrical circuit means having input conductor means and output conductor means, power supply means connected to said input conductor means for supplying electrical power to said circuit means, said circuit means including unijunction transistor means electrically connected to said input conductor means and to said output conductor means, said circuit means being adapted to generate a continuous oscillating electrical signal having substantially a saw tooth wave form of continuously varying frequency at said output conductor means and transducer means connected to said output conductor means adapted to convert said electrical signal into a continuous sonic signal.

2. A device according to claim 1 wherein said circuit means includes resistance means and said unijunction transistor means is electrically connected to said input conductor means and to said output conductor means through said resistance means.

3. A device according to claim 1 wherein said power supply means includes a positive and a negative output conductor, said unifunction transistor means comprising first and second unijunction transistors, each of said unijunction transistors comprising a first and a second base terminal and an emitter terminal; first and second resistors connected in parallel between said first base terminals of said first and second transistor respectively and said negative output conductor of said power supply means, third and fourth resistors connected in parallel between said second base terminals of said first and second transistors respectively and said positive output conductor of said power supply means.

4. A device according to claim 3 wherein said transducer includes first and second input conductors, said first transducer input conductor being connected to said negative conductor of said power supply means; fifth and sixth resistors connected in parallel between said emitter terminals of said first and second transistors and said second input conductor of said transducer.

5. A device according to claim 4 including a capacitor connected between said second input conductor of said transducer and said negative output conductor of said power supply and a seventh resistor connected between said second input conductor of said transducer and said positive conductor of said power supply means.

6. A device according to claim 5 wherein said third resistor consists of a variable resistor.

7. A method of repelling insects from a specified location comprising generating a continuous sonic signal comprising a substantially saw tooth wave form of a fundamental frequency and harmonic components thereof, continuously varying the frequencies of said fundamental frequency signal and said components of said signal, directing said continuous sonic signal to said specified location; wherein said frequencies are continuously varied from minimum to maximum values, said frequencies being reduced from maximum to minimum values at a rapid rate.

8. A method according to claim 7 wherein said signal comprises a substantially saw tooth wave form with a fundamental frequency between 10 and 50 kilohertz, said signal having a variable sweep rate between 6 and 40 cycles per second.

9. A method according to claim 8 wherein said signal includes a resonant peak of a frequency adapted to repel a particular insect species.

* * * * *